United States Patent
Feng et al.

(10) Patent No.: US 9,503,366 B2
(45) Date of Patent: Nov. 22, 2016

(54) METHOD AND APPARATUS FOR SVE REDUNDANCY

(75) Inventors: Chao Feng, San Jose, CA (US); Samar Sharma, San Jose, CA (US); Sriram Chidambaram, Sunnyvale, CA (US); Raghavendra J. Rao, Bangalore (IN); Sanjay Hemant Sane, Fremont, CA (US); Murali Basavaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/297,568

(22) Filed: Nov. 16, 2011

(65) Prior Publication Data

US 2013/0121137 A1     May 16, 2013

(51) Int. Cl.
*H04L 12/713*     (2013.01)
*H04L 12/24*     (2006.01)
*H04L 12/26*     (2006.01)

(52) U.S. Cl.
CPC ......... *H04L 45/586* (2013.01); *H04L 41/0663* (2013.01); *H04L 43/028* (2013.01)

(58) Field of Classification Search
CPC   H04L 41/0663; H04L 43/028; H04L 45/586
See application file for complete search history.

(56) References Cited

U.S. PATENT DOCUMENTS

| | | | |
|---|---|---|---|
| 7,003,692 B1* | 2/2006 | Banks et al. | 714/12 |
| 8,806,266 B1* | 8/2014 | Qu et al. | 714/4.11 |
| 2008/0177896 A1* | 7/2008 | Quinn et al. | 709/238 |
| 2008/0285438 A1* | 11/2008 | Marathe et al. | 370/220 |
| 2010/0165985 A1* | 7/2010 | Sharma et al. | 370/389 |

* cited by examiner

*Primary Examiner* — Chirag Shah
*Assistant Examiner* — Rina Pancholi
(74) *Attorney, Agent, or Firm* — Meunier Carlin & Curfman LLC

(57) ABSTRACT

Systems and methods for providing service virtualization endpoint (SVE) redundancy in a two-node, active-standby form. An active-standby pair of SVEs register with a cloud-centric-network control point (CCN-CP) as a single service node (SN) using a virtual IP address for both a control-plane and a data-plane. At any given time, only the active SVE is a host for the control-plane and the data-plane. When a failover happens, the hosting operation is taken over by the standby SVE, therefore the failover will be transparent to CCN-CP and the SN.

19 Claims, 7 Drawing Sheets

METHOD AND APPARATUS FOR SVE REDUNDANCY

BACKGROUND

Approximately a third of all IT spending is consumed in the data center. With such a large share of IT Total Cost of Ownership (TCO) concentrated in the data center, changes in architecture can materially impact IT spend and corporate competitiveness. While the trends of virtualization and cloud computing offer data center architecture opportunities, there are also challenges. High-end data center design is challenged with increasing complexity, the need for greater workload mobility and reduced energy consumption. Traffic patterns have also shifted significantly, from primarily client-server or as commonly referred to as north-to-south flows, to a combination of client-server and server-server or east-to-west plus north-to-south streams. These shifts have wreaked havoc on application response time and end user experience, since the network is not designed for these Brownian motion type flows.

High availability in the data center refers not only to device-specific availability and uptime, but also to network design and features that prevent downtime in the case of a catastrophic event. Uptime in this context refers to availability of the switch to direct traffic. As more and more equipment is added to the data center network, the high availability of the network may be undermined. Network architects need to consider design best practices to reduce single points of failure and achieve network uptime goals in the data center.

SUMMARY

Systems and methods for providing service virtualization endpoint (SVE) redundancy in a two-node, active-standby form. An active-standby pair of SVEs register with a cloud-centric-network control point (CCN-CP) as a single service node (SN) using a virtual IP address for both a control-plane and a data-plane. At any given time, only the active SVE is a host for the control-plane and the data-plane. When a failover happens, the hosting operation is taken over by the standby SVE, therefore the failover will be transparent to CCN-CP and the SN.

In accordance with a method of the present disclosure, redundancy in a service insertion architecture may be include: providing a service classifier (SCL) that performs traffic classification and service header insertion; providing a first services virtualization endpoint (SVE) and a second services virtualization endpoint (SVE) at a virtual IP address, the first SVE and the second SVE each providing access to service nodes; replicating service chaining information from the first SVE to the second SVE; redirecting packets received at the SCL to the first SVE at the virtual IP address; directing the packets in accordance with a mapping for processing; and returning the packets to the SCL.

In accordance with service insertion architecture of the present disclosure, there is provided a cloud-centric-network (CCN) control point that maintains an ordered list of service nodes and a path connecting each element in the order; a service classifier (SCL); one or more services virtualization endpoints (SVEs); and one or more service nodes (SNs) that provide services within the service insertion architecture. The one SVE registers with the CCN at a virtual IP address, and wherein a packet enters the service insertion architecture at the SCL and is directed to the SNs via the one SVE at the virtual IP address.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
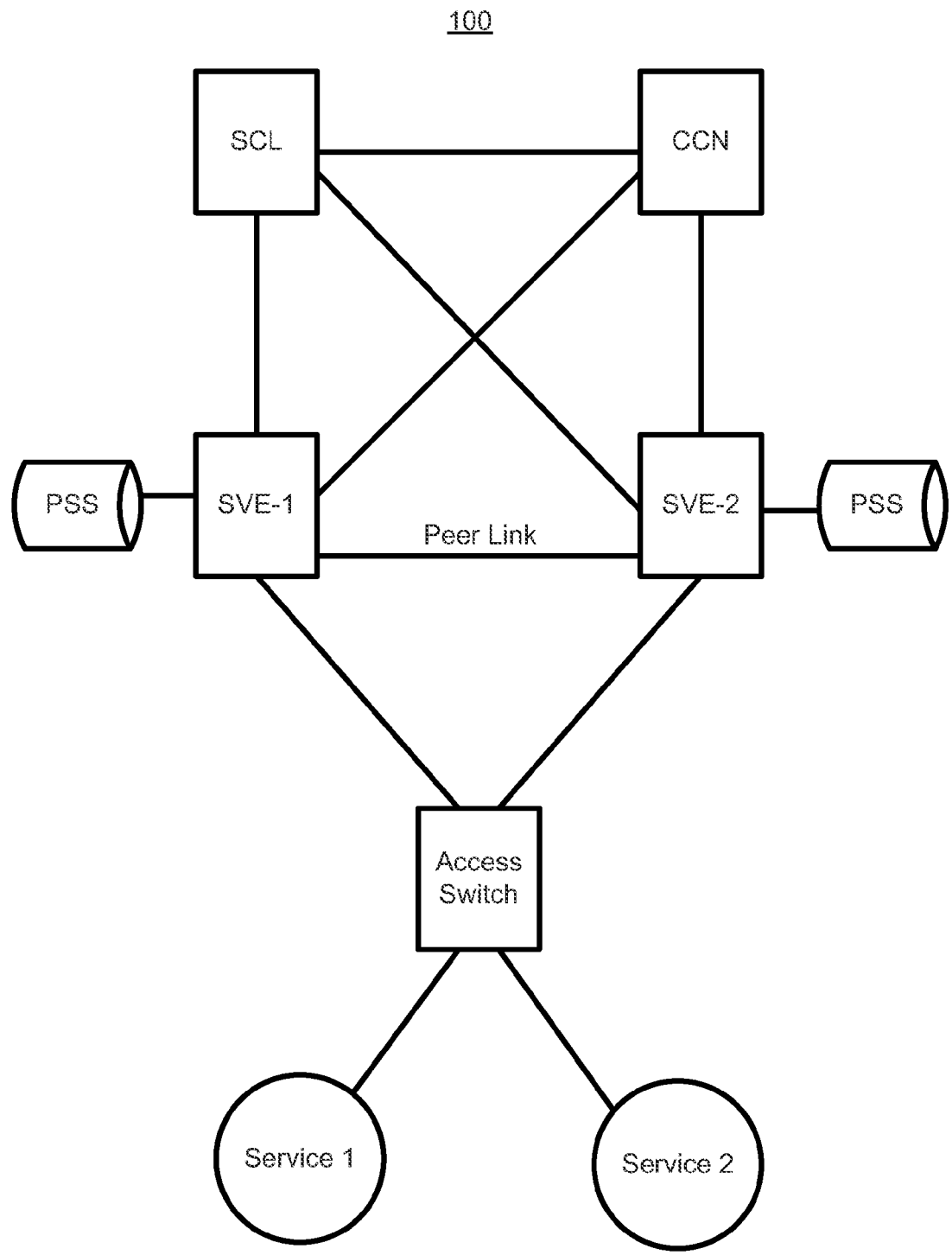
FIG. 1 illustrates an exemplary Service Insertion Architecture (SIA) infrastructure having a Services Virtualization Endpoint (SVE) with redundancy.

As will be described in detail herein with reference to several exemplary implementations, systems and methods for providing Services Virtualization Endpoint (SVE) redundancy and load-sharing in a Service Insertion Architecture (SIA) infrastructure are provided. With reference to FIG. 1, the SIA 100 may consist of a control plane and data plane. The SIA control plane functionality may include Cloud-Centric-Network (CCN) Control Point, a Service Classifier (SCL), one or more Services Virtualization Endpoints (SVE) and a Service Node (SN). The SIA data plane functionality may include the Service Classifier (SCL), the one or more Services Virtualization Endpoints (SVE), and the Service Node (SN).

The Cloud Centric Network (CCN) Control Point (CP) is the central control plane entity in the SIA domain. The CCN CP maintains the mapping between the classification context and the service paths. Each service path may contain one classification context, an ordered list of service nodes and a path connecting each element in the order as defined in the policy. In addition to maintaining information about active services, the CCN CP aids in the creation and binding of service paths, thus facilitating the setup of the data path. For high availability, CCN CPs implemented on multiple chassis may be clustered using an NX-OS Cluster Infrastructure. All the configuration of CCN CPs is maintained consistent throughout the cluster using Reliable Group Communication facility of NX-OS Cluster Infrastructure.

The Service Classifier (SCL) performs initial traffic classification and service header insertion. SCL is the entry point in the data path to SIA domain and is typically present at the edge of a network. The SCL is the first (head) node in a service-path. The SCL mainly interacts with the CCN CP in the control-plane and with SVE in the data plane.

The Services Virtualization Endpoint (SVE) front-ends service nodes and off-loads the complex SIA data plane functions such as service chaining, transport encapsulation, decapsulation and routing from the actual service. For high availability, SVEs running on two different chassis may be grouped together using Virtual PortChannel (VPC). In this configuration one of the SVEs functions as an active SVE while the other will be in standby mode from Control Path perspective. CCN CP will duplicate configuration between the two SVEs. This aspect of the disclosure is discussed in further detail below.

The Service Node (SN) delivers the actual service in the SIA service-path. The service node communicates with CCN-CP in the control and SVE in the data plane. In the data plane, the SVE bridges data packets between the SCL or another SVE and the service node. In other words, in the data plane, the SCL intercepts the interested traffic and redirects it into the service path comprising of ordered service nodes. Each Service Node (SN) is front-ended by an SVE. After the traffic reaches SVE, the traffic flows from one service node to another in the order it was provisioned until it reaches the last service node. When a packet flows to another service node, it is always via the SVE. The last service node returns the traffic back to SVE which decides whether to redirect it back to SCL or forward it. The Service Nodes is always Layer-2 adjacent to the SVE. When there is more than one SVEs present, they can be either Layer-2 or Layer-3 away between two SVEs.

The SIA data plane functions may include classification and SIA context tagging, redirection and service selection. With respect to classification and SIA context tagging, the classifier intercepts the interested traffic and inserts a shared context in the packet. The shared context primarily constitutes a unique id (e.g., a traffic classification id) and service ordering information for next service selection in the service path the tagged traffic is redirected. This id conveys the classification context, i.e., the result of classification, information to the service nodes in the service path. Service nodes may use this id to apply service specific polices to the packets. The id remains constant across a service path. In addition, it also represents a service path the traffic is flowing in a SIA domain. It may also represent the service path in an SIA domain. If the path is linear, it is often referred to as a chain. The id is used to derive the path to the next hop at each service node. The id may be used to virtualize services in the network which means that the irrespective of the service device location, the packet tagged with the same classification id will always undergo the same set of services in the SIA domain.

With respect to redirection, each SIA physical device at data plane level, may redirect the tagged packets to the next hop physical device in the service path. The redirection is done using the available transport mechanisms of the underlying network. For example, a GRE tunnel may be used for this purpose. This redirection tunnel may be shared between two physically or logically adjacent SIA devices and is used to carry entire SIA traffic for multiple service paths that flows between the two devices.

In accordance with some implementations, SVE functionality on SVE1 and SVE2 may be clustered together so that they act as though there is only one SVE from the CCN's perspective. During bootstrap configuration, one SVE may be assigned as master, the other slave. A virtual name, a virtual IP and a virtual MAC may be hosted by the master SVE. Both SVEs advertise their capabilities and their corresponding master slave roles. The CCN is responsible for keeping both SVEs informed of the service path segments creation/deletion. As a result, the Ternary Content Addressable Memory (TCAM) entries of both master and slave SVEs may be identical and ready to forward packets along the service path. This ensures that the data path traffic can actually enter any of the SVE nodes and can get forwarded directly to the service or back to the SCL without having to traverse the peer link (vPC) that connects both SVE nodes together.

The SCL is configured to communicate to a virtual IP address exposed via First Hop Redundancy Protocol (FHRP) to the master SVE entity. For example, where there is one Service, one SCL and two SVEs, both SVEs maintain identical TCAM entries. If SCL is Layer-2 adjacent to SVE, then vPC can be formed between SCL and the two SVEs. The traffic from SCL to SVE reaches either SVE, depending on flow-based load-balancing at SCL. That SVE forwards the packet to the service. There is no need for the packets to flow between SVE-1 and SVE-2. If SCL is Layer-3 adjacent to SVE, it is possible that the packet can follow a route through SVE2 before it gets to SVE1. Again, SVE-2 can directly forward the packet if there is a TCAM match.

Similarly, for the reverse traffic from the service going back to SVE. Either SVE can handle the traffic and send it back to SCL. The slave SVE keeps a regular health check against the master SVE. If the master SVE fails, the slave SVE will take over the virtual IP, virtual MAC and virtual name and become the master.

In some implementations, the scheme can further be enhanced such that only certain TCAM entries are synchronized between the two SVEs. For the TCAM entries which are not synchronized, a user can specify the load balancing weights among the two SVEs. For example, the user may want one SVE to handle more traffic. For the TCAM entries which are synchronized, a user can rely on RBH (result based hash) in the ASIC for load-balancing.

In some implementations, one of the SVEs may be configured with more TCAM entries than the other SVE. As such the former SVE will carry more traffic than the later SVE. The above may be implemented for load balancing between the SVEs. This may also be based that SVE-1 is more powerful than SVE-2 (not the other way around), and SVE function cost is more than packet forwarding function (e.g., the SVE is implemented in software instead of in a hardware ASIC).

With reference to FIG. 1, SVE redundancy may be provided such that if one SVE fails (e.g. SVE-1), a user does not lose services provided by a failed SVE, but rather is serviced by a surviving SVE (e.g., SVE-2).

Figure 2:
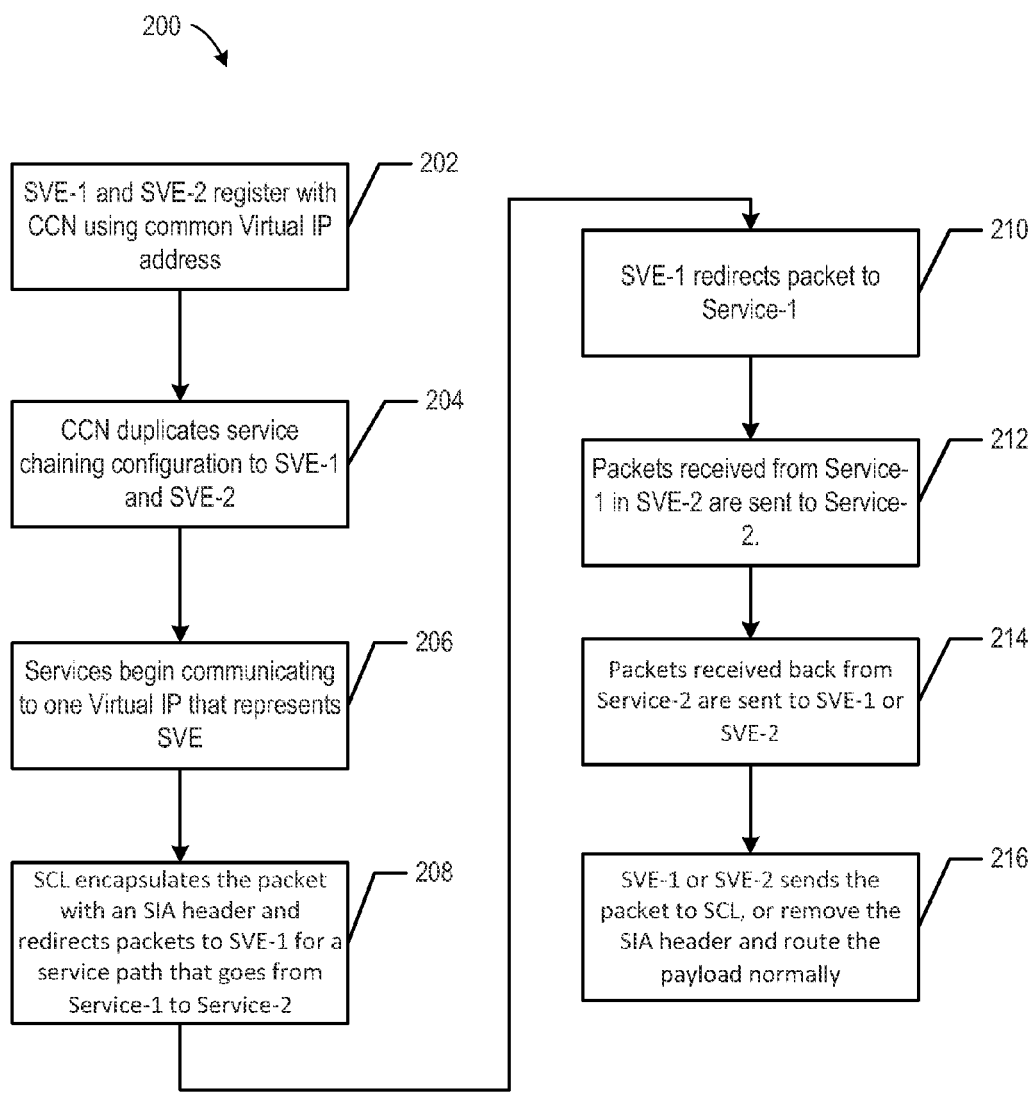
FIG. 2 illustrates an exemplary operational flow diagram for providing SVEs within the SIA Infrastructure of FIG. 1 where the SVEs have redundancy.

With reference to FIG. 2, there is illustrated an exemplary operational flow diagram for providing an SVE in the SIA 100 of FIG. 1 where the SVEs provide redundancy. FIGS. 3-7 illustrate data flows within the SIA 100 during the execution of the operational flow of FIG. 2. As noted above, SVE redundancy may be provided such that if one SVE fails (e.g. SVE-1), a user does not lose services provided by a failed SVE, but rather is serviced by a surviving SVE (e.g., SVE-2).

Figure 3:
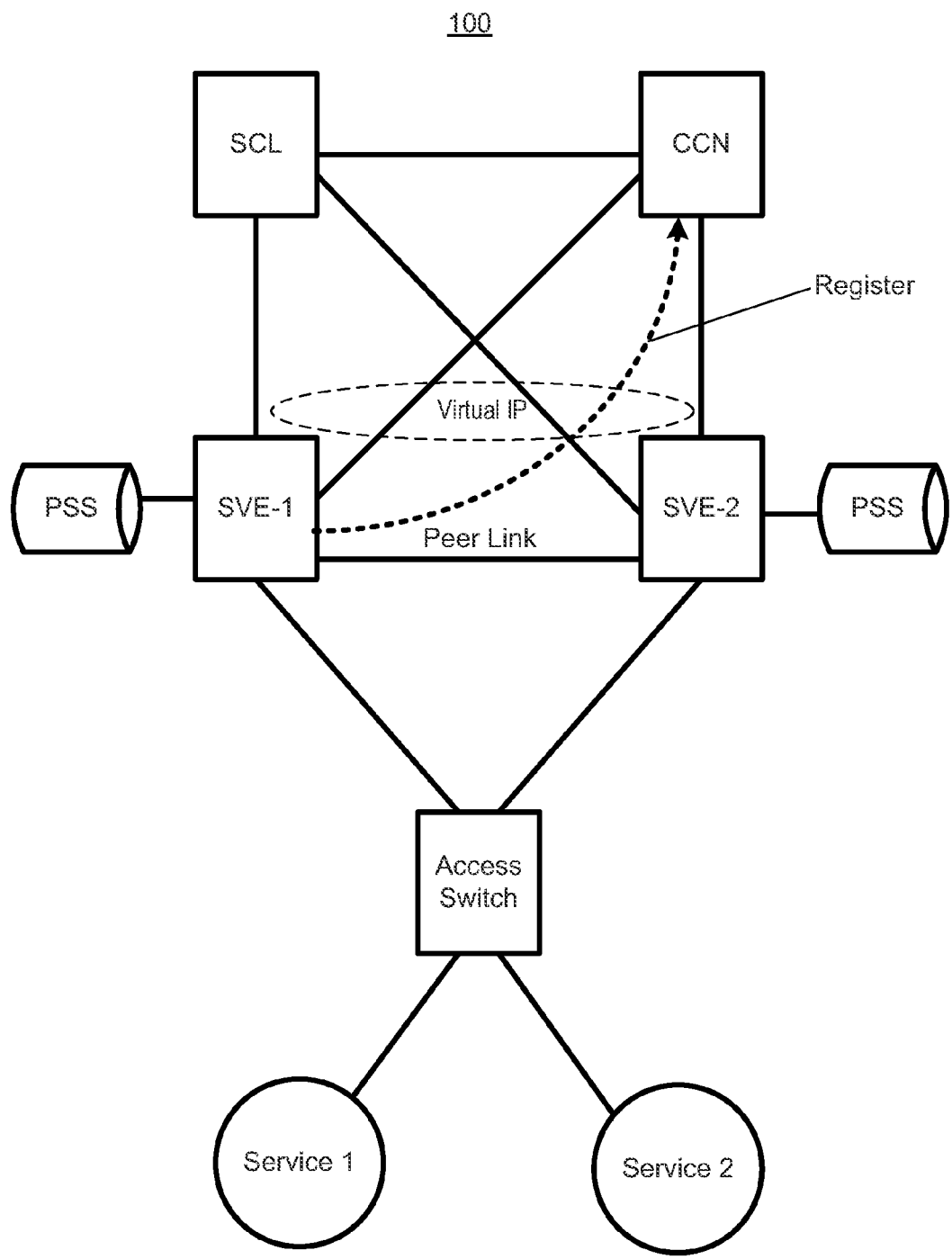
FIGS. 3-7 illustrate data flows within the SIA Infrastructure during the execution of the operational flow of FIG. 2.

At 202, the SVE-1 and SVE-2 register with the CCN using a Hot Standby Router Protocol (HSRP) Virtual IP address. The Hot Standby Router Protocol (HSRP) is a CISCO protocol that provides network redundancy for IP networks, ensuring that user traffic immediately and transparently recovers from first hop failures in network edge devices or access circuits. A virtual IP address (VIP) is an IP address that is not connected to a specific computer or network interface card (NIC) on a computer. Incoming packets are sent to the VIP address, but they are redirected to physical network interfaces. VIPs may be used for connection redundancy. For example, a VIP address may still be available if a computer or NIC fails because an alternative computer or NIC replies to connections. As shown in FIG. 3, during the operation 202, one SVE (e.g., SVE-1) registers with the CCN. As such SVE-1 and SVE-2 have a common Virtual IP, and the CCN will only see one SVE, i.e., SVE-1.

At 204, the CCN duplicates the service chaining configuration to SVE-1 and SVE-2 to keep them identically configured. As a result, the TCAM entries in SVE-1 and SVE-2 are identically programmed. Additionally or alternatively, the TCAM entries in SVE-1 and SVE-2 may be synchronized by communicating the entries between each other.

Figure 4:
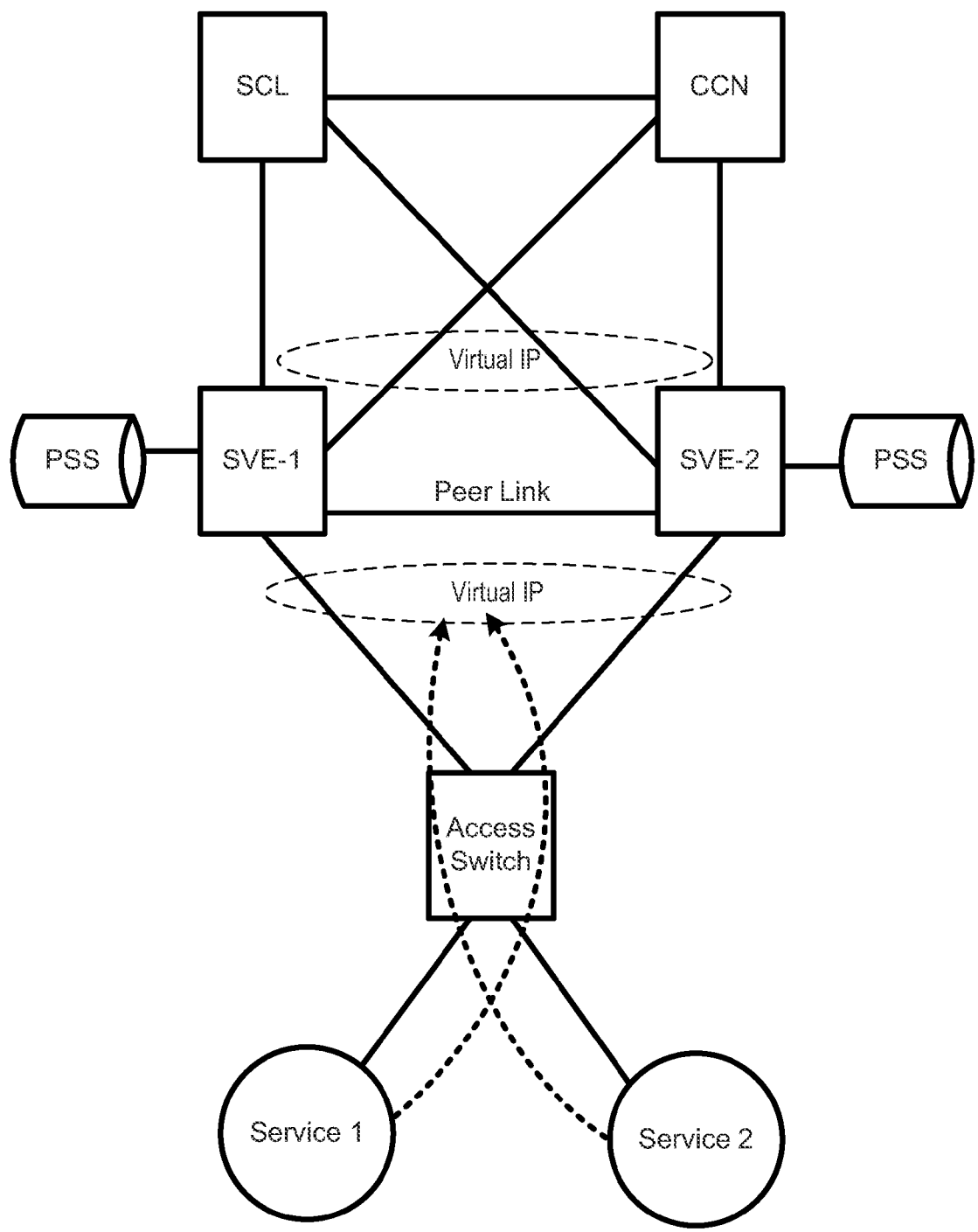

At 206, services begin communicating to the Virtual IP that represents SVE. As shown in FIG. 4, SVE-1 and SVE-2 will have the HSRP virtual IP switch virtual interface (SVI) at the access side of SIA 100. As such, Service-1 and Service-2 communicate to the Virtual IP, and packets are directed to the active SVE, e.g., SVE-1.

Figure 5:
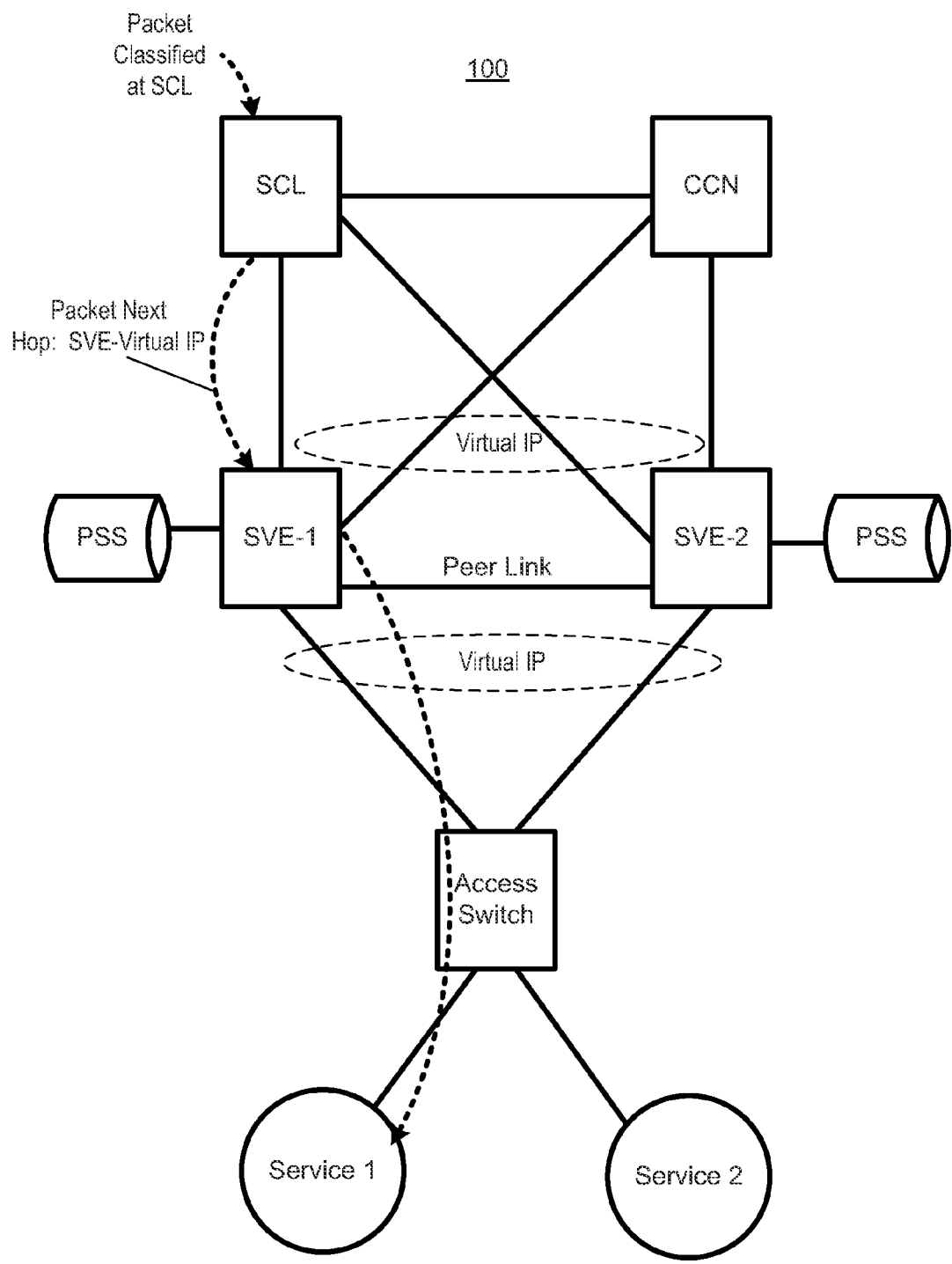

At 208, the SCL encapsulates the packet with an SIA header and redirects packets to SVE-1 for a service path that goes from Service-1 to Service-2 based on the Virtual IP. As shown in FIG. 5, an inbound packet received by the SCL is classified and send to SVE-1. At 210, SVE-1 redirects packet to Service-1, as the packet is destined for that service. As shown in FIG. 5, SVE-1 forwards the packet to Service-1.

Figure 6:
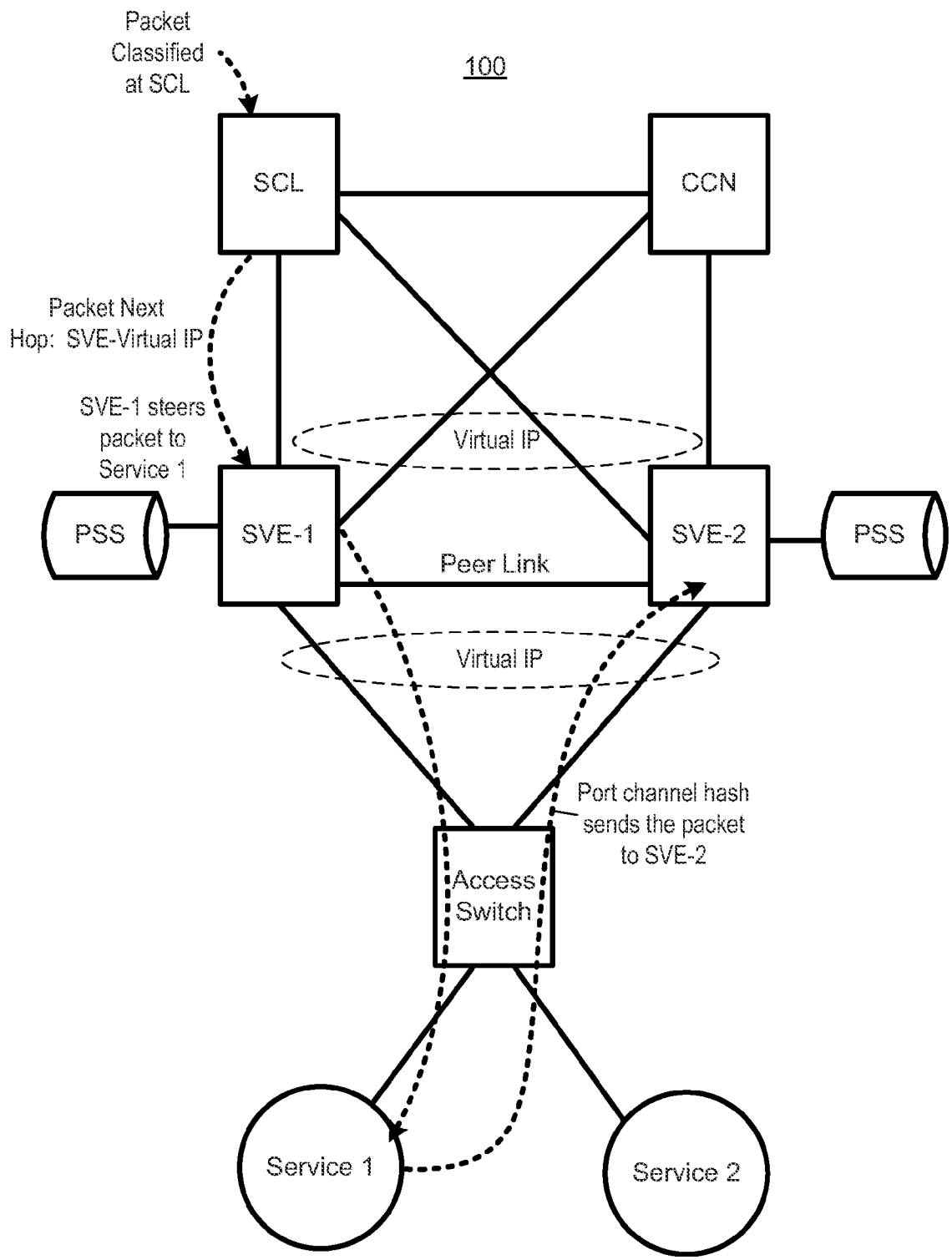
Figure 7:
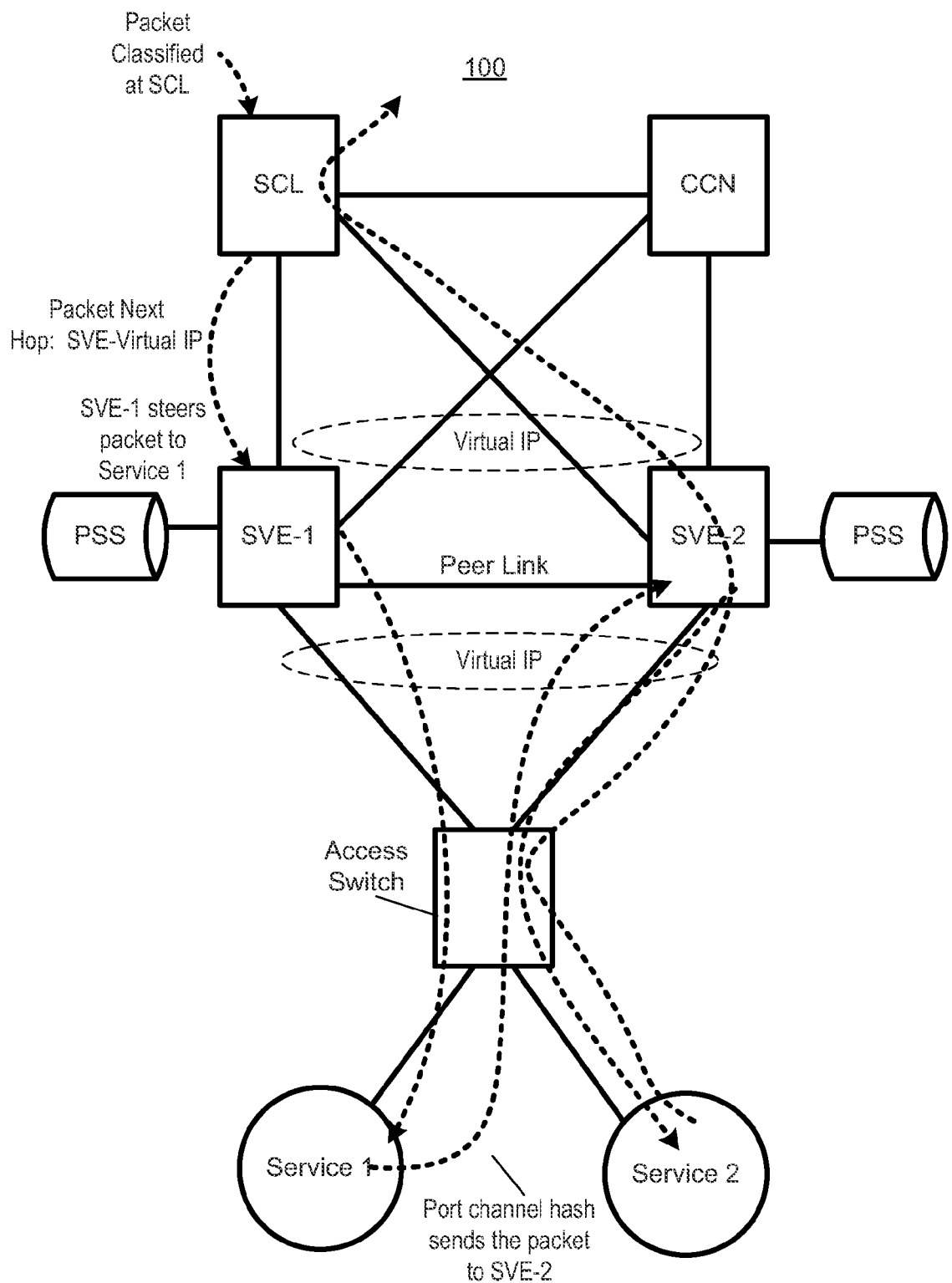

At 212, packets received from Service-1 are returned. As shown in FIG. 6, packets may be sent from Service-1 to SVE-2 based on a port channel hash. In some implementations, SVE-2 may be programmed with the identical TCAM entries as SVE-1. As such, SVE-2 does not need to forward the return packet to SVE-1 over peer link, rather SVE-2 can service the packet directly. With reference to FIG. 7, SVE-2 may forward the packet to Service 2 for further processing.

At 214, packets are received back from Service-2 are sent to SVE-1 or SVE-2. At 216, SVE-1 or SVE-2 sends the packet to SCL, or remove the SIA header and route the payload normally, As shown in FIG. 7, the packets are returned to SVE-2 and then sent to the SCL or otherwise routed.

Thus, in accordance with the operation flow of FIG. 2, from the standpoint of the CCN, there is only one SVE (SVE-1) that is identified by the Virtual IP, whereas SVE-2 is a standby. However, from a data path standpoint, both SVE-1 and SVE-2 are active and able to serve packets.

In some implementations, the SVE-1 may be implemented in software. As such, a larger TCAM table size may be possible. In such an implementation, all TCAM entries may be synchronized, as table size is not a limitation.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing redundancy in a service insertion architecture, comprising:
    providing a service classifier (SCL) that performs traffic classification and service header insertion, the service header including service ordering information related to one or more service nodes that apply service-specific policies to packets received at the SCL;
    providing a first services virtualization endpoint (SVE) and a second services virtualization endpoint (SVE), the first SVE and the second SVE each sharing a same virtual IP address in a control path, the first SVE and the second SVE each connected to the one or more service nodes in a data path;
    providing identical service chaining information in the first SVE and the second SVE, the identical service chaining information being indicative of a next hop associated with a service path;
    redirecting the packets received at the SCL to the virtual IP address such that both the first SVE and the second SVE are configured to forward the packets across the data path when the first SVE is active and then to the one or more service nodes, in accordance with a mapping for processing, the mapping being an ordered list of the one or more service nodes and a path connecting the one or more service nodes; and
    returning the packets to the SCL.

2. The method of claim 1, further comprising registering both the first SVE and the second SVE at the virtual IP address.

3. The method of claim 2, further comprising:
    providing a cloud centric network control point (CCN-CP) that maintains the mapping, which is an ordered list of the service nodes and a path connecting the service nodes; and
    registering the first SVE and the second SVE with the CCN-CP at the virtual IP address such that the CCN-CP only sees the first SVE.

4. The method of claim 3, further comprising:
    storing the service chaining information in a ternary content addressable memory (TCAM); and
    replicating, by the CCN-CP, the TCAM entries between the first SVE and the second SVE.

5. The method of claim 1, wherein the service nodes communicate to the virtual IP address.

6. The method of claim 5, further comprising directing the packets to the first SVE.

7. The method of claim 1, further comprising:
    storing the service chaining information in a ternary content addressable memory (TCAM); and
    replicating the TCAM entries between the first SVE and the second SVE, wherein the first SVE and the second SVE communicate directly with each other.

8. The method of claim 1, further comprising:
    detecting a failure of the first SVE;
    redirecting packets received at the SCL to the second SVE at the virtual IP address; and
    directing the packets in accordance with the mapping for processing.

9. The method of claim 1, further comprising storing the service chaining information in a ternary content addressable memory (TCAM); and
    replicating predetermined ones of the TCAM entries between the first SVE and the second SVE.

10. The method of claim 9, wherein a RBH (result based hash) is used for load-balancing.

11. The method of claim 1, further comprising:
    storing the service chaining information in a ternary content addressable memory (TCAM); and
    replicating the TCAM entries between the first SVE and the second SVE.

12. The method of claim 1, further comprising:
    storing the service chaining information in a ternary content addressable memory (TCAM); and
    configuring the first SVE with more TCAM entries than the second SVE.

13. A service insertion architecture, comprising:
    a cloud-centric-network (CCN) control point that maintains an ordered list of service nodes and a path connecting each element in the order;
    a service classifier (SCL) that performs traffic classification and service header insertion, the service header including service ordering information related to one or more service nodes that apply service-specific policies to packets received at the SCL;
    a first services virtualization endpoints (SVE) and a second services virtualization endpoint (SVE), wherein the first SVE and the second SVE each share a same virtual IP address in a control path, the first SVE and the second SVE are each in data communication with the service nodes in a data path when one of the first SVE and the second SVE is active, and the first SVE and the second SVE each comprise Ternary Content Addressable Memory (TCAM), wherein TCAM entries comprising service chaining information of the first and second SVEs are maintained to be identical such that the service chaining information between the first and second SVEs is identical, the identical service chaining information being indicative of a next hop associated with a service path; and
    one or more service nodes that provide services within the service insertion architecture,
    wherein at least one SVE registers with the CCN at a virtual IP address, and wherein a packet enters the service insertion architecture at the SCL and is directed to the service nodes via the one SVE at the virtual IP address, and
    wherein both of the first SVE and the second SVE are configured to forward the packet in the data path to the service nodes in accordance with a mapping comprising an ordered list of the service nodes and a path connecting the service nodes.

14. The service insertion architecture of claim 13, wherein if-one of the SVE fails, the other SVE services the packet.

15. The service insertion architecture of claim 13, wherein the TCAM entries are replicated between the SVEs by the CCN.

16. The service insertion architecture of claim 13, wherein the TCAM entries are replicated by the SVEs communicating directly with each other.

17. The service insertion architecture of claim 13, wherein only predetermined ones of the TCAM entries are replicated between the SVEs.

18. The service insertion architecture of claim 13, wherein load balancing weights are applied to the TCAM entries in one of the SVEs.

19. A method for providing redundancy in a service insertion architecture, comprising:
    providing a cloud centric network control point (CCN-CP);
    providing a first services virtualization endpoint (SVE) and a second services virtualization endpoint (SVE), the first SVE and the second SVE each sharing a same virtual IP address in a control path, such that the CCN-CP only sees the first SVE while both the first SVE and the second SVE are connected to service nodes in a data path;
    providing a service classifier (SCL) that performs traffic classification and service header insertion, the service header including service ordering information related to one or more of said service nodes that apply service-specific policies to at least one packet received at the SCL;
    redirecting packets received at the SCL to the virtual IP address,
    providing identical service chaining information in the first SVE and the second SVE, the identical service chaining information being indicative of a next hop associated with a service path, wherein both of the first SVE and the second SVE are configured to forward the at least one packet across the service path to the service nodes in accordance with the service chaining information when one of the first SVE and the second SVE is active;
    wherein the forwarding comprises:
    redirecting the packets received at the SCL to the first SVE at the virtual IP address, when the first SVE is an active SVE;
    redirecting the packets received at the SCL to the second SVE at the virtual IP address based on a detected failure of the first SVE such that the second SVE is the active SVE; and
    forwarding the packets by the active SVE in the service path to the one or more service nodes in accordance with a mapping for processing, the mapping being an ordered list of the one or more service nodes and a path connecting the one or more service nodes.

* * * * *